March 18, 1969
P. F. M. GAMBS
3,433,560
OPHTHALMOLOGICAL SLIT LAMP
Original Filed Aug. 28, 1962
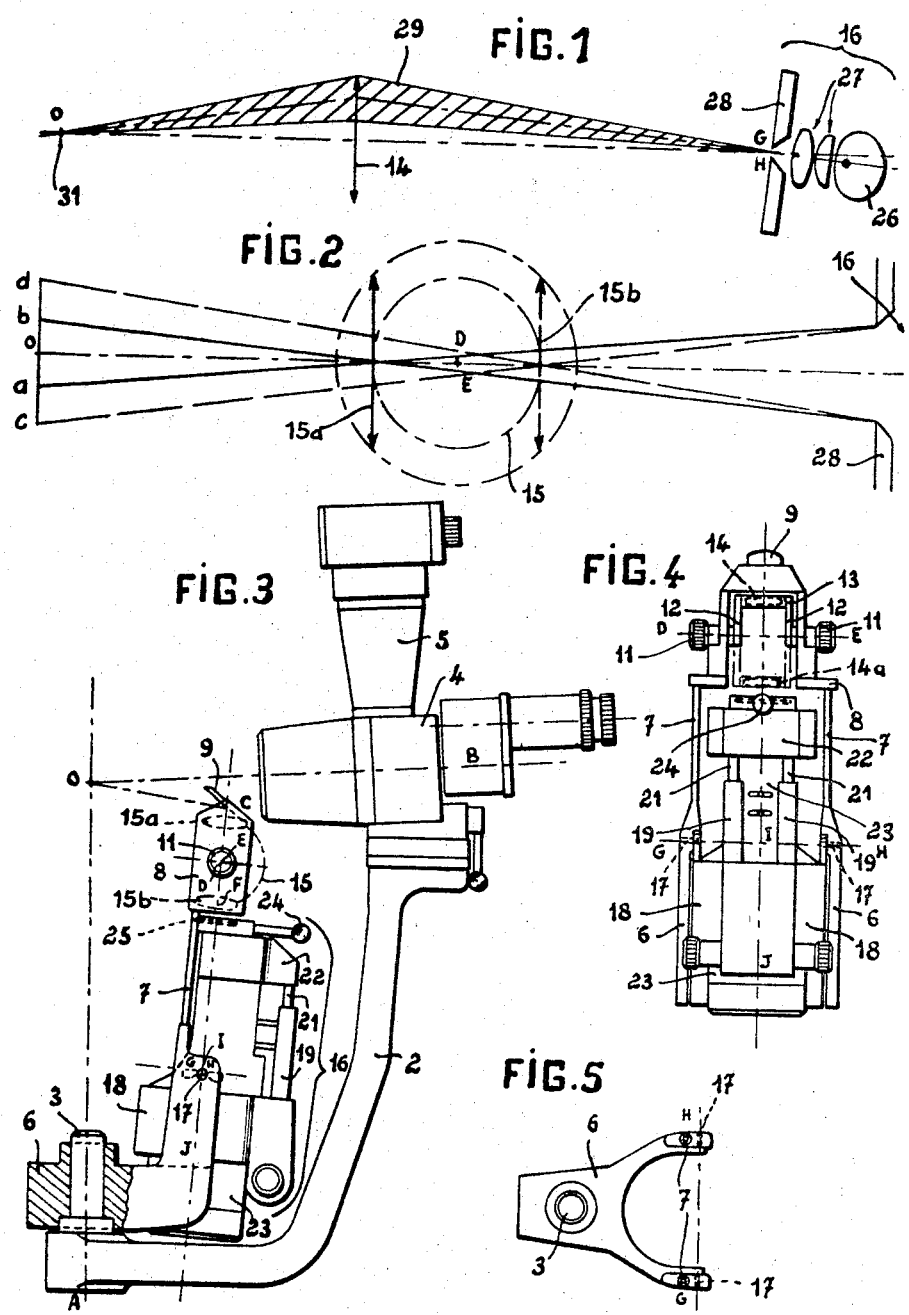
INVENTOR:
PAUL FRÉDÉRIC MARIE GAMBS
BY E. M. Squire
ATTY.

United States Patent Office 3,433,560
Patented Mar. 18, 1969

3,433,560
OPHTHALMOLOGICAL SLIT LAMP
Paul Frédéric Marie Gambs, 140–142 Rue Mazenod,
Lyon, France
Continuation of application Ser. No. 219,910, Aug. 28,
1962. This application Sept. 21, 1967, Ser. No. 669,654
Claims priority, application France, Oct. 6, 1961,
41,911
U.S. Cl. 351—14                                   2 Claims
Int. Cl. A61b 3/10

ABSTRACT OF THE DISCLOSURE

An ophthalmological slit lamp structure wherein the angle of incidence of the slit imaging beam at the eye may be varied or the magnification of the image may be changed without disturbing the focusing of the image of the slit upon the eye. The slit lamp structure comprises a slit with its lamp and condenser lens and an objective lens which focuses a real image of the slit on a particular portion of the eye, the image and the particular portion of the eye on which it is formed being observed by means of a microscope.

This application is a continuation of my application Ser. No. 219,910 filed Aug. 28, 1962, now abandoned.

The present invention relates to ophthalmological slit lamps and more particularly to apparatus of this character wherein the angle of incidence of the slit imaging beam at the eye may be varied or the magnification of the image may be changed without disturbing the focusing of the image of the slit upon the eye.

The slit lamp according to the invention comprises the usual slit with its lamp and condenser lens and an objective lens which focuses a real image of the slit on a particular portion of the eye, the image and the particular portion of the eye on which it is formed being observed by means of a microscope.

One aspect of the invention involves the traversing of the slit imaging beam across the objective lens whereby the angle of incidence of the beam at the eye may be varied without disturbing the focusing of the image of the slit. Readjustment for various angles of incidence is thus avoided.

In another aspect, the objective lens is movable between two positions symmetrically located at opposite sides of the midpoint of the optical path from the slit to the image. This movement is produced by a rotary support movable through 180° whereby one side of the objective lens continuously faces the rotational axis of the support and the other side is directed either toward the image or toward the slit, whichever is the nearer to the lens. Because each side of the lens is always maintained at the same distance from either the image or the slit, as the case may be, anastigmatic and achromatic correction problems are greatly simplified. In either position, the focusing of the image is maintained and no readjustment is required.

According to my invention, the optic system of the slit projecting lamp including at least the source of light and the condenser and also preferably the slotted diaphragm rotates around an axis passing through the plane of said diaphragm and extending perpendicularly or substantially to the optic axis of the projecting objective, said objective remaining stationary so that the incidence of the beam of light forming the image of the slot may vary without modifying the position of said image.

The invention will be more clearly understood by reading the following specification with reference to the accompanying drawing:

Referring to the drawing:

FIG. 1 is a diagrammatic view of the optic system showing the luminous beam projected obliquely by the condenser to one side of the objective so that the angle of incidence at the object is oblique but the focusing remains undisturbed.

FIG. 2 illustrates the projector objective in each of its two operative positions together with the corresponding image sizes.

FIG. 3 is a side view of a biomicroscope equipped with such an optical system, the stand or adjustable support being conventional and therefore not shown.

FIG. 4 is a rear elevational view of the slot-projecting lamp portion of the apparatus.

FIG. 5 is a plan view of a bifurcated supporting arm for the lamp and the illuminated slot.

My improved biomicroscope intended for use for ophthalmological examination, includes in conventional manner:

A forehead-rest and a chin-rest which hold the patient's head in the desired position.

A base or stand, which allows adjustment of the apparatus so as to bring the eye to be examined into registry with the point O where the observation and the illumination axes OB and OC converge (FIG. 3) on the common vertical pivotal axis OA for the microscope and for the slot-illuminating lamp. This conventional structure has been omitted from the drawing for simplicity of illustration, except for the pivot 3 of the base (not shown) which provides the vertical pivotal axis OA.

An arm 2 revolvable on the pivot 3 carries a corneal microscope 4 of conventional type including a photographic camera 5.

Above the arm 2, the vertical pivot 3 carries an upwardly bent bifurcated supporting arm 6 which is also revoluble on said pivot. The upper end of arm 6 includes extensions constituted by two upright rods 7 carrying the lens housing 8. The housing 8 carries at its upper end a reflector 9, constituted by a prism or a mirror. Across the middle of housing 8, there extends a horizontal bi-partite shaft 11 with a control knob at each end. In its central section, the horizontal shaft 11 is interrupted, and to the inner ends thus formed, there are connected spaced parallel radial arms 12 the of which carry a mounting ring 13 for the objective lens 14. By turning the shaft 11 through one half revolution, it is therefore possible to cause the objective 14 to move along the arc of a circle 15 as illustrated in FIGS. 2 and 3, so as to bring it from position 15a into the position 15b. The objective is thus turned upside down by rotation about the axis DE accompanied by its displacement along the optical path between two operative positions 15a and 15b. The axis DE of shaft 11 is perpendicular to the optical axis and passes transversely through the midpoint of the optical path extending between the illuminated slot 28 and its image focused at O.

As shown by the diagram of FIG. 2, the objective 14, when in its position 15a, produces a reduced image ab of the slot 28 whereas in its position 15b, it produces an enlarged image cd which is larger than the image ab.

The entire slit-lamp portion including the lower section containing the slot-illuminating lamp 16 is mounted for pivotal movement about a horizontal transverse axis GH defined by two aligned trunnions 17 journaled in two bearings carried by the arms of the bifurcated supporting arm 6. The two trunnions 17 are rigid with the cradle 18 of the lamp housing the rear end of which includes upwardly directed extensions formed by two sleeves 19 serving as guides for the rods 21, rigid with the support 22. The actual body 23 of the lamp including the illuminating bulb, the condenser, the slotted diaphragm and the auxiliaries, revolves round the axis IJ in two coaxial bearings formed respectively in the cradle 18 and in the member 22. The lamp body 23 extends upwardly beyond the member 22 so as to form a short projection which carries a lever 24 through which it is possible to control the rotation of the lamp round said longitudinal axis IJ.

It is immediately apparent that the pivotal oscillatory movement of the lamp 16 about the axis GH with reference to the objective 14 which is stationary satisfies the conditions required for the optic system as disclosed hereinabove and as illustrated in FIG. 1. It is also apparent that all the drawbacks referred to hereinabove as produced by the former types of biomicroscopes, have been removed and in particular, the equilibrium of the oscillatory system is a stable equilibrium and cannot even be rendered indifferent.

The apparatus illustrated includes a glass plate 25 flat parallel sides which closes the upper end containing the body 23 of the lamp in a fluid-tight manner.

The amplitude of pivotal movement is limited by the maximum permissible opening of the objective, but it is nevertheless sufficient to meet the requirements of practice.

As illustrated diagrammatically in FIG. 1, the lamp system 16 including a source of light 26, a condenser 27 and a slotted diaphragm 28 pivots about axis GH in a manner such that the luminous beam 29 sweeps over a diameter of the objective 14 while the image 31 of the slot remains stationary as to its position at O and as to its size.

In the above-described apparatus, the vertical angle of incidence between the illumination axis and the observation axis varies between 2.5° and 17.5° or thereabouts when the objective is in its upper position 15a, and between 6° and 14° or thereabouts, when the objective is in its lower position 15b.

In the apparatus illustrated, the lower part 16 of the lamp pivots freely about the axis GH. Since the center of gravity of the complete lamp system 16 is not located on the axis GH, it will be necessary for the pivotal movement to be readily restrained.

While I have shown and described what I believe to be the best embodiments of my invention, it will be apparent to those skilled in the art that various changes and modifications may be made therein without departing from the spirit and scope of the invention as defined in the appended claims.

What is claimed is:

1. Ophthalmological apparatus of the class described, comprising: pivot means defining a vertical axis which passes through a predetermined portion of an eye to be examined; microscope means connected to said pivot means for rotation about said vertical axis, said microscope means normally being focused at said vertical axis for observation of said portion of said eye; slit lamp means including the entire lamp assembly connected to said pivot means for rotation about said vertical axis, a portion of said slit lamp means including slit diaphragm means, a lamp, a condenser being further mounted for rotation about a horizontal axis independently of said rotation about said vertical axis, said horizontal axis being spaced from said vertical axis toward said microscope means; said slit diaphragm means positioned substantially along said horizontal axis; said slit lamp means being focusable to produce an illuminated image of a slit at said vertical axis, said condenser adapted to direct a light beam passing through the slit in the slit lamp means along a first optical path; objective lens means in said first path, said objective means including means for directing said beam along a second optical path terminating at said predetermined portion of said eye; and arm means pivoted to said slit lamp means for movement through a semi-circular arc about a horizontal axis located midway along the optical path from said slit to said image thereof, said objective lens means being carried by said arm means and focusing said image of said slit on said predetermined portion of said eye at both extremities of said arm means.

2. Apparatus according to claim 1, wherein said microscope means has a continuous rectilinear optical axis which is downwardly inclined to intersect said vertical axis at said portion of said eye, and in which said slit lamp means has a bipartite optical axis, said slit lamp means including reflecting means, said bipartite axis including a first portion which is directed generally vertically upwardly to said reflecting means and a second portion which is upwardly inclined from said reflecting means to intersect said vertical axis at said portion of said eye along with said optical axis of said microscope means.

References Cited

UNITED STATES PATENTS 1,578,251  3/1926  Arruga.
2,999,422  9/1961  Papritz.

FOREIGN PATENTS 292,104  1/1932  Italy.

DAVID SCHONBERG, *Primary Examiner.*

P. A. SACHER, *Assistant Examiner.*